March 1, 1960 D. F. BROWER 2,927,163

ELECTROMAGNETIC TRANSDUCERS

Filed Sept. 12, 1955 2 Sheets-Sheet 1

DAVID F. BROWER,
INVENTOR

BY Henry Heyman
ATTORNEY

March 1, 1960 D. F. BROWER 2,927,163

ELECTROMAGNETIC TRANSDUCERS

Filed Sept. 12, 1955 2 Sheets-Sheet 2

DAVID F. BROWER
INVENTOR

BY Henry Heyman
ATTORNEY 2,927,163

ELECTROMAGNETIC TRANSDUCERS

David F. Brower, Torrence, Calif., assignor to Hughes Aircraft Company, Culver City, Calif., a corporation of Delaware Application September 12, 1955, Serial No. 533,602

6 Claims. (Cl. 179—100.2)

The present invention relates to magnetic recording systems and more particularly to an improved magnetic recording and reproducing head for use in perpendicular recording systems.

Two basically different magnetic recording systems are presently used in view of the fact that magnetization is expressed in terms of fields having a vector designation. Most commercial equipment has employed "longitudinal" recording on a magnetic recording medium in which the direction of magnetization lies substantially parallel to the motion of the recording medium. The recording systems with which the present invention is concerned are those utilizing "perpendicular" or vertical recording in which the direction of magnetization lies predominantly perpendicular to the direction of motion and the surface of the recording medium.

The development of magnetic storage components for binary digital computers has placed increasing emphasis on better resolution of recorded signals, higher speed of recording and of playback, and greater signal storage capacity per unit area of the recording medium. The advantages of perpendicular recording in achieving these objectives have been pointed out, for example, in U.S. Patent No. 2,680,156 for "Magnetic Head for Perpendicular Recording," to Ragnar Thorensen. The Thorensen patent describes the use of a single conductor arranged in a loop configuration to provide a pair of magnetic fields which aid and strengthen each other within the loop, and which provide the necessary magnetomotive force for vertical recording upon a medium whose surface is positioned immediately beneath the loop and parallel to the plane thereof.

In constructing magnetic drum memories for computer systems it has been generally found desirable to position the magnetic heads very precisely with respect to the drum surface, permitting a maximum error of the order of only one mil. The same order of precision has been required in the internal construction of each magnetic head. Meeting these requirements has proven to be very difficult and expensive.

It is therefore an object of the invention to provide a new and improved magnetic head for perpendicular recording and reproducing.

It is a further object of the invention to provide a magnetic head for perpendicular recording, which has a highly directional magnetizing field.

It is a still further object of the invention to provide a magnetic head for perpendicular recording which produces a smaller size magnetic spot and thus allows more magnetic storage per unit area of recording medium for pulse type information such as that employed in binary digital computers.

Yet another object of the invention is to provide a magnetic head for perpendicular recording which has very low inductance, permitting short pulses or high frequency signal current to be passed therethrough for faster recording.

Still another object of the invention is to provide a magnetic recording head for perpendicular recording having an improved mechanical arrangement of the parts, whereby more precise construction can be achieved while permitting greater ease of manufacture.

Yet a further object of the invention is to provide a "sandwich" type of construction of a magnetic recording head.

Another object of the present invention is to provide an improved magnetic head for perpendicular magnetic recording and reproducing, by combining a magnetic head and a coupling transformer into a single integral structure.

The present invention provides an improved type of magnetic head which, like that disclosed by Thorensen, includes a single conductor disposed in a loop configuration for generating a pair of aiding magnetic fields. According to the present invention, however, an entirely different concept of the mechanical construction of the device is established. The present invention provides a solid magnetic structure having twin gaps in its operative surface for receiving opposite sides of the single-conductor loop. Not only does the present invention provide a magnetic head having characteristics greatly superior to those known hitherto, but the ease of manufacture is a substantial advantage over previously known magnetic heads. According to the present invention a thin flat ribbon of conducting material is utilized to provide the loop, and a thin sheet of high permeability material is positioned within the loop as a center pole piece to provide a path for the magnetic field in its region of greatest density. In assembling the magnetic head a pair of solid blocks of high permeability material is then positioned immediately on each side of the loop to provide the main pole pieces. As the final step in the assembly the head surface is ground smooth in one single operation, thus insuring precise alignment between the surface of the main pole pieces, of the center pole piece, and of each side of the single-conductor loop.

The general principles of the type of mechanical construction utilized in the present invention are illustrated in copending U.S. patent applications for "Magnetic Transducers," by David F. Brower, Serial No. 454,551, filed September 7, 1954, which issued as Pat. No. 2,863,002 on December 2, 1958, and for "Integral Transformer Electromagnetic Transducer," by David F. Brower et al., Serial No. 499,142, filed April 4, 1955, which issued as Pat. No. 2,840,643 on June 24, 1958, and assigned to the assignee of the present application; and in an article entitled "A One Turn Magnetic Reading and Recording Head for Computer Use," by David F. Brower, published in the 1955 IRE Convention Record, part 4, at pages 95–100. The magnetic recording heads described in the copending applications and in the reference article, however, are for longitudinal, rather than vertical, recording.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only, and are not intended as a definition of the limits of the invention.

Figures 4, 5, 6, 7A, 7B, 7C, 8:
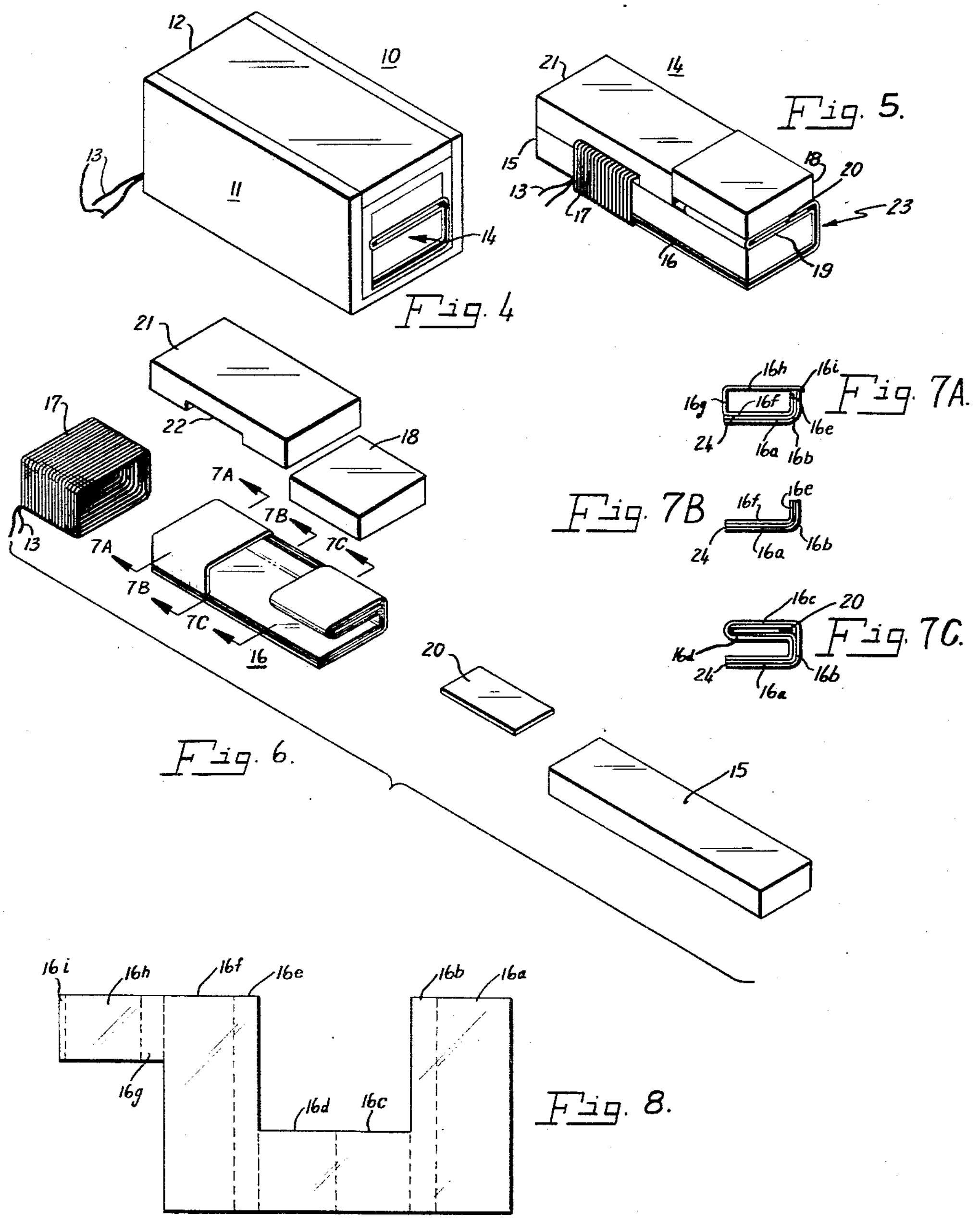
Fig. 4 is an isometric view of another embodiment of the invention, wherein a magnetic head and a coupling transformer comprise an integral structure mounted within a case, and only the operating face of the head is visible.
Fig. 5 is an isometric view of the embodiment of Fig. 4, shown without the case.
Fig. 6 is an exploded view of the embodiment of Figs. 4 and 5, illustrating all of the individual parts which make up the integral structure shown in Fig. 5.

Figs. 7A, 7B, and 7C are sectional views of various portions of a coupling yoke shown in Figs. 5 and 6 and taken on lines 7A—7A, 7B—7B and 7C—7C; and Fig. 8 is a developed view of the coupling yoke.

Figure 1:
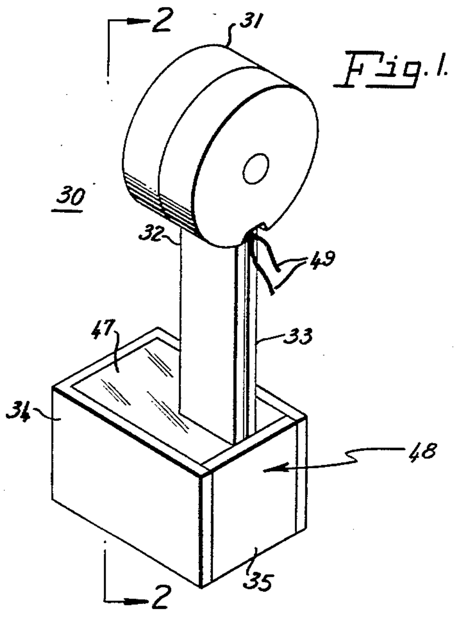
Fig. 1 is an isometric view of one embodiment of the invention, including a magnetic head mounted within a case and a coupling transformer as a separate unit.

Reference is now made to Fig. 1 illustrating, as a first embodiment of the invention, a magnetic head assembly 30, which includes a coupling transformer 31 having input leads 49 and connected by means of a pair of output leads 32 and 33 to a case 34 made of conductive and nonmagnetic material such as brass which houses a magnetic head, generally indicated at 48. Leads 32 and 33 are preferably a pair of copper bars in spaced parallel relation. Leads 49 which serve as input leads during recording operations become the output leads during reproducing operations, as will be apparent to those skilled in the art. Case 34 has on one vertical surface thereof a lid 35, and the exposed upper surface of the case is covered with a layer of insulating material 47. Transformer 31 is preferably of the cup-core or pot-core type which is in conventional usage and therefore requires no further explanation.

Figure 2:
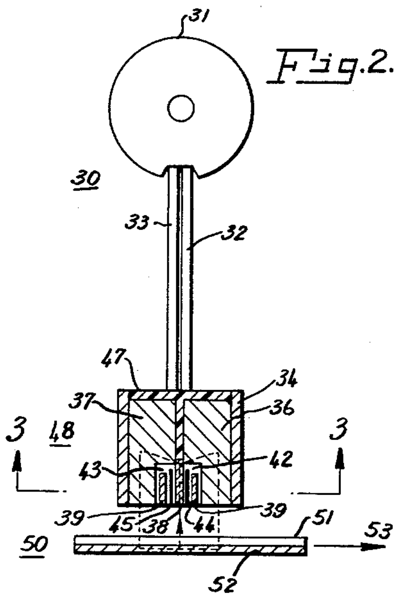
Fig. 2 is a vertical section of the embodiment of Fig. 1, view from the rear and taken on line 2—2 of Fig. 1.

Reference is now made to Fig. 2 wherein a vertical section of the magnetic head 48 is shown on an exaggerated horizontal scale in order to more clearly illustrate the various parts and their relative locations. Fig. 2 also illustrates the position of a recording medium 50 relative to magnetic head 48, and the direction of motion of the recording medium indicated by arrow 53 relative to the magnetic head. Of particular interest is the operating face of magnetic head 48, hereafter referred to as the head surface. The head surface includes a vertical center pole piece 38, a pair of vertical conductor portions 39 disposed on either side of the center pole piece 38, and main pole pieces 36 and 37 disposed outside the conductors 39. Suitable insulation such as paper strips 44 and 45 are provided to insulate conductors 39 from center pole piece 38. While Fig. 2 illustrates paper strips 44 and 45 spaced from conductors 39 and pole piece 38 for purposes of clarity, it will be understood that in an actual embodiment the conductors 39 are in contact with paper strips 44, 45 which in turn contact pole piece 38. Center pole piece 38, conductors 39 and main pole pieces 36 and 37 are all of rectangular geometrical shape. Main pole piece 36 has a recess 42 therein for receiving one of the conductors 39 and insulating strip 44, while main pole piece 37 has a recess 43 for receiving the other conductor 39 and insulating strip 45. The bottom surface of center pole piece 38 will be referred to as the center pole face, and the bottom surfaces of main pole pieces 36 and 37 will be referred to as the main pole faces. Main pole pieces 36 and 37 have a small gap in the horizontal direction, corresponding to the horizontal thickness of center pole piece 38. Center pole piece 38 extends into the space between main pole pieces 36 and 37, and is substantially in contact with the main pole pieces, thus providing a low-reluctance magnetic path or magnetic circuit from the center pole face through the center pole piece and through the associated main pole piece to each one of the main pole faces as indicated by the dotted lines.

Recording medium 50 has a layer 51 of high retentivity and high coercive force material, backed on the under surface thereof by a portion of high permeability material 52. As shown by arrow 53, the recording medium 50 moves substantially at right angles to the center pole piece 38.

Figure 3:
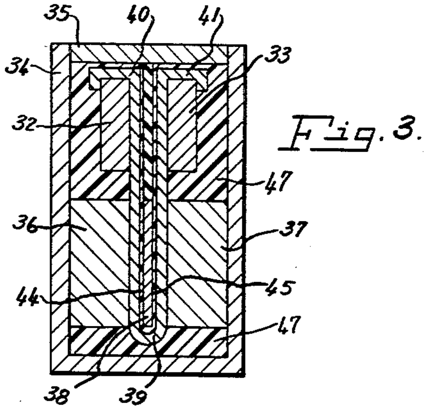
Fig. 3 is a sectional view of the under surface of the magnetic head of Figs. 1 and 2 between lines 3—3 of Fig. 2.

The mechanical arrangement of magnetic head 48 is also illustrated in Fig. 3, showing a sectional view looking toward the head surface. For greater clarity, Fig. 3 is shown to approximately twice the scale of Figs. 1 and 2. As shown in Fig. 3 the conductors 39 comprise a single loop which passes around one vertical edge of the center pole piece 38, the ends 40 and 41 of the loop being in conductive contact with the bars or leads 32 and 33, respectively. Insulating strips 44 and 45 also comprise a single loop, in order to completely insulate the conductor loop 39 from the center pole piece 38.

Both Figs. 2 and 3 show the magnetic head 48 encased within the housing 34 and lid 35. All areas within the housing not occupied by main pole pieces 36 and 37, center pole piece 38, conducting loop 39, insulating strip 44, 45, and leads 32, 33, are filled with the insulating material 47. Insulating material 47 may be any satisfactory type of plastic insulation or potting compound, and is applied by means of techniques well known in the art.

Main pole pieces 36 and 37 are preferably formed of a ferrite material, which has high magnetic permeability, low retentivity, and displays a high specific resistivity. The main pole pieces may, however, be comprised of other suitable material which is slotted or laminated in order to minimize eddy current losses. Center pole piece 38 may also be formed from ferrite material, but is preferably made of Permalloy. The center pole piece must be very thin in order to provide a high concentration of flux in a narrow region at the center pole face, in order to secure high resolution, hence a thickness in the range from one-half mil to two mils is preferred. Although ferrite has satisfactory characteristics for use in the center pole piece 38, it is difficult to work, and therefore it is considered more practical to form the center pole piece from a malleable metal such as Permalloy. Single-conductor loop 39 is formed of a metallic ribbon, preferably silver foil having a thickness of the order of one mil. Insulation loop 44, 45 is required if center pole piece 38 is made of Permalloy or other conductive material, but may be omitted if ferrite is used. The use of a conductive material in center pole piece 38 does not cause excessive eddy current loss because of the very thin dimensions of the piece.

The operation of the embodiment of Figs. 1–3 will be described with particular reference to Fig. 2. The operation during recording will be considered first. Driving signals are supplied to coupling transformer 31 by means of the input leads 49, and appear via the transformer secondary upon output leads 32, 33. Leads 32, 33 in turn supply the current to conducting loop 39 which is positioned at the head surface. Coupling transformer 31 is required for impedance matching purposes, as is well known in the art. The flow of current within conducting loop 39 creates a magnetomotive force which produces a flux through center pole piece 38. As shown by the dotted lines, half of this flux flows through main pole piece 36 and its main pole face, in a distributed area and with low flux concentration through layer 51, along layer 52, and in high concentration through a small area of layer 51 and back through the center pole face. The other half takes a similar path through main pole piece 37 as shown.

Thus by providing main pole faces each having a width dimension, measured in the direction of relative movement between the magnetic head and the recording medium, which is a substantial multiple of the corresponding dimension of the center pole face, the other pole face dimensions being substantially the same, the flux density variations at the center pole face with changes in magnetic flux in the magnetic circuit swamp flux density variations at the main pole faces, or, stated otherwise, the flux density variations at said pole faces with flux density variations in said magnetic circuit, occur substantially only at the center, or smaller, pole face. Thus magnetic resolution for both detecting, or reading, and recording exists only at the center pole face.

This type of operation is described in detail, for example, in the above-referred to patent to Thorensen, where the advantages of the perpendicular type of recording are also pointed out. The variations of signal current within the single-conductor loop produce corresponding variations in the magnetic field, and the relative motion between the magnetic head and the recording medium produce magnetic "spots" which are permanently recorded vertically upon the high retentivity upper layer 51 of recording medium 50. During reproduction, the operations are inverted with the vertically recorded magnetic spots on the moving medium producing variations in the magnetic field, which in turn produce variations in the current flowing within single conductor loop 39, which applies a signal current to transformer 31 and thence to an output circuit.

The embodiment of the invention disclosed in Figs. 1–3 has electrical and magnetic characteristics which are superior to those of the type of magnetic head disclosed in the patent to Thorensen. The principal advantage of the present invention, however, is in the ease of fabrication of the magnetic head. During operation of the magnetic head 48 the current flowing within conducting loop 39 is heavily concentrated at the head surface, i.e., it is heavily concentrated at the edge of the metallic ribbon which lies immediately along the under surface of the magnetic head. The reason for this is that current tending to flow in the upper portions of the metallic ribbon meets a substantially higher self-inductance, thus limiting the current flowing in that portion of the conductor to a very small amount.

During assembly of the head, the center pole piece 38, the two sides of the conducting loop 39, and main pole pieces 36, 37, are put together in the form of a five-layer "sandwich"; all of the layers of the sandwich are bonded together; and the head surface is then ground smooth to a desired shape. The method of assembling the sandwich is fairly obvious, and of course includes the proper positioning of insulating strips 44, 45, and insulating material 47. Since the current flowing within conducting loop 39 tends to concentrate at the edge of the loop lying along the head surface, the exact location of the head surface becomes of secondary importance. In effect, the edge of the ribbon 35 becomes a movable "wire" which will position itself at the head surface, wherever that may be. An actual test has been made to determine how critical the operation of the head is with respect to the amount of grinding required to smooth the head surface. Two heads were made as nearly identical as possible; the surface of one head was ground by approximately two mils, and the surface of the other head by approximately 20 mils; and the electro-magnetic operation of both heads was then tested and compared. Substantially no difference was observed in the operation of the two heads.

The advantage of case 34 is that it confines the magnetic influence of the magnetic head and minimizes cross-talk between two or more heads which might be positioned close to each other. A type of construction which is often advantageous is the use of a mounting block, including separate slots for a plurality of magnetic heads, and a lid for each slot, in order to precisely position a group of magnetic heads with respect to each other. This technique is described, for example, in the above referred to application, Serial No. 454,551 by Brower. Although in Fig. 2 the head surface is illustrated as entirely flat, other shapes may be used in order to adapt the head surface to any desired contour for presentment to a tape or drum, as is also pointed out in the copending application to Brower.

Reference is now made to Figs. 4–8 wherein a second embodiment of the invention is illustrated. Like the first embodiment, this modification of the invention also includes a five-layer sandwich comprising the operating surface of the magnetic head. A special feature of the embodiment of Figs. 4–8 is the forming of the magnetic head and of the coupling transformer as an integral structure, providing low inductance and making possible improved efficiency. A compact structure having a very small overall size is attained.

A magnetic head for longitudinal recording which is formed integral with its coupling transformer is described in the above-mentioned application, Serial No. 499,142 by Brower et al. In that application some of the principles of mechanical construction of the embodiment of Figs. 4–8 of the present invention are also disclosed.

Fig. 4 illustrates the complete structure of the second embodiment of the invention, generally designated by 10, and including a magentic head assembly 14 enclosed in a case 11 having a lid 12, with a pair of input or output leads 13 protruding from the rear end of the case. Case 11 and lid 12 consist of an electrically conductive, non-magnetic material such as brass. The operating face of the head assembly 14 is visible at the front of the case.

In Fig. 5 the magnetic head assembly 14 is illustrated without the case. The magnetic head surface is designated generally by 23. An elongated rectangular block 15 of magnetic material provides a common structural member linking a coupling transformer with the magnetic head, and includes an upper portion upon which a transformer winding 17 is mounted, and a lower portion having an end surface which forms one of the main pole faces of head surface 23. A second rectangular block 18 of magnetic material, positioned in parallel relation to block 15, has an end surface which provides the other main pole face. A center pole piece 20 comprising a thin rectangular sheet of magnetic material is positioned between blocks 15 and 18, one edge thereof providing the center pole face. A single-conductor loop 19 provides a pair of conductors positioned on opposite sides of the center pole piece and between blocks 15 and 18. Just as in the first embodiment, main pole pieces 15 and 18 are made of material having low reluctance, low magnetic retentivity, and high specific resistivity, preferably ferrite. Center pole piece 20 may be made of ferrite although Permalloy is preferred. Single-conductor loop 19 comprises a ribbon of electrically conductive metal, preferably silver foil. Loop 19 is preferably insulated from center pole piece 20 by means of a ribbon of insulating paper, not shown in Fig. 5, and the entire magnetic head assembly 14 is preferably potted or encased in plastic insulating material before being included in case 11, in the same manner as described in connection with the first embodiment.

Coupling yoke 16 shown in Fig. 5 provides an electrical circuit connection between the magnetic head and the coupling transformer. Yoke 16 includes an upper loop, as will be more fully explained hereinafter, serving as a secondary winding for transformer winding 17 (which operates as a primary winding during recording operations), includes in its lower portion the loop 19, and also includes as a central coupling portion two conductors which connect the upper loop and the loop 19 together to form a closed circuit. The upper loop portion of yoke 16, not visible in Fig. 5, substantially encircles the upper portion of block 15. Transformer winding 17 in turn is wound about this upper loop. In order to provide adequate coupling between the transformer primary and the transformer secondary and to reduce the leakage flux, a third rectangular block 21 of magnetic material, preferably ferrite, is positioned in contact with blocks 15 and 18. Block 21 has a recess 22 therein (shown in Fig. 6) for receiving one side of winding 17 and the upper loop of yoke 16. Blocks 15 and 21 therefore together form a complete circulation path for magnetic flux around one side of the winding 17 and the associated portion of yoke 16. A substantially continuous magnetic path of low reluctance also exists from the center pole face through pole piece 20, and through the ferrite blocks to each of the main pole faces.

Reference is now made to Fig. 6 wherein the magnetic head assembly 14 is shown in exploded form. The shape of coupling yoke 16 is clearly illustrated by Fig. 6 in combination with Figs. 7A, 7B, and 7C. Thus Fig. 7A is a sectional view of the upper loop portion of yoke 16, successive sections of the loop starting from the lower left hand corner and reading counter-clockwise being labeled 16*a*, 16*b*, 16*i* (soldered to 16*b*) 16*h*, 16*g*, 16*f*, 16*e*. The two ends of the loop are insulated from each other by means of an insulating strip 24.

Fig. 7B is a cross section of the central portion of coupling yoke 16, including an upper conductor having sections labeled 16*e* and 16*f*, and a lower conductor including sections 16*a* and 16*b*, the two conductors being insulated from each other by the strip 24.

Fig. 7C is a cross section of the lower portion of coupling yoke 16. It illustrates the loop 19 including an upper section 16*c* connected to the lower conductor of Fig. 7B, and a lower section 16*d* connected both to section 16*c* and the upper conductor of Fig. 7B. Fig. 7C includes a reference numeral 20 indicating the position which the center pole piece assumes when the magnetic head is assembled. Fig. 7C also indicates the insulating strip 24 which insulates the two sides of the loop from each other, and from center pole piece 20.

Coupling yoke 16 is a shaped sheet metal member comprising a complete circulation path for electrical current, and is preferably silver foil. It is not essential that yoke 16 have the specific shape illustrated in the drawings, although that configuration is advantageous in minimizing leakage inductance and other undesirable effects.

The method of assembling the embodiment of Figs. 4–8 is apparent from Fig. 6 taken in combination with the description of the first embodiment of the present invention. The manner of forming coupling yoke 16 is illustrated in Fig. 8, wherein the dotted lines indicate places where the silver foil is to be folded. Labeling of the various sections of the silver foil corresponds to the reference characters used in Figs. 7A, 7B, and 7C.

A typical set of values for the second embodiment of the invention is as follows:

Winding 17, 80 turns of #39 copper wire
Blocks 15, 18, 21, made of Ferrox Cube No. 3–C
Length of block 15, one-half inch
Thickness of blocks 15, 18, 21, one-sixteenth inch
Width of blocks 15, 18, 21, three thirty-seconds of an inch
Silver foil thickness (yoke 16), one mil
Pole piece 20, thickness one mil It is therefore apparent that the present invention provides a new and improved type of magnetic head, which has particular advantages in the ease of fabrication and the ease of obtaining the desired degree of precision in the mechanical construction.

What is claimed as new is:

1. A magnetic head for recording magnetic signals perpendicularly to a magnetic recording medium and for reproducing them, said head comprising a single conductor having the configuration of an elongated loop, a pair of main pole pieces of high permeability-high resistivity material and positioned on opposite sides of said loop in close proximity thereto, a center pole piece consisting of a section of high permeability material positioned at least partially within said loop perpendicular to the plane thereof, and having portions engaging said main pole pieces, forming a magnetic circuit between said center pole piece and said main pole pieces, each main pole piece terminating in a main pole face and said center pole piece terminating in a small pole face, each main pole face having a dimension which is a substantial multiple of the corresponding dimension of said small pole face, the remaining dimensions of said pole faces being substantially the same, that flux density variations at said small pole face with changes in flux in said magnetic circuit, swamp flux density variations at said main pole faces, and means connected to the ends of said loop to receive or produce magnetizing signal current.

2. The magnetic head defined in claim 1 wherein said main pole pieces and said center pole piece consist of ferrite, and said single conductor is a thin flat ribbon of silver foil folded to provide a pair of flat planes spaced in close parallel relation to each other.

3. The magnetic head claimed in claim 1 wherein said center pole piece is a ferromagnetic metallic ribbon having high permeability, said head further including a layer of insulating material positioned within said loop and insulating said center pole piece therefrom.

4. A magnetic head for magnetic recording and reproducing, said head comprising: a thin flat rectangular sheet of high permeability material, one edge thereof providing a center pole face; first and second elongated rectangular blocks of material having high permeability and high resistivity, positioned in parallel relation on opposite sides of said thin sheet, each having an end surface substantially aligned with said edge of said thin sheet, thereby providing a pair of main pole faces; a flat ribbon of metallic foil wound substantially around said thin sheet to form a pair of flat conductors spaced closely parallel to each other between said first and second blocks and on opposite sides of said thin sheet, said ribbon having one edge substantially aligned with said center pole face and said main pole faces to form a desired shape of the head surface; and means providing a substantially continuous magnetic circuit from said center pole face through said thin sheet, through the associated block to each of said main pole faces, each main pole face having a dimension which is a substantial multiple of the corresponding dimension of said center pole face, the remaining dimensions of said pole faces being substantially equal, that flux density variations at said center pole face with flux changes in said magnetic circuit, swamp flux density variations at said main pole faces.

5. In a magnetic recording and reproducing system including a recording medium having a layer of high retentivity-high coercive force material backed by a portion of high permeability material, a magnetic head for recording magnetic signals perpendicularly on the medium or for reproducing signals from the medium comprising a thin flat metallic ribbon forming a pair of flat conductors spaced in close parallel relation to each other and connected in a loop for conducting currents in opposite directions, a center pole piece comprising a thin flat sheet of high permeability material positioned within said loop, and a pair of main pole pieces each comprising an elongated rectangular block of high permeability-high resistivity material and positioned on opposite sides of said loop immediately adjacent thereto, and having surface portions engaging surface portions of said center pole piece forming a three-legged magnetic circuit, one edge of said center pole piece, constituting a center pole face, and one surface of each of said main pole pieces, respectively constituting main pole faces, being aligned together to form a smooth substantially continuous surface adapted to be disposed adjacent to said recording medium with said center pole piece positioned at right angles to the direction of motion of the recording medium relative to the magnetic head, each main pole face having a dimension which is a substantial multiple of the corresponding dimension of said center pole face, the remaining dimensions of said pole faces being substantially the same, that flux density variations at said center pole face with flux changes in said magnetic circuit, swamp flux density variations at said main pole faces.

6. The combination of a magnetic head for magnetic recording and reproducing with a coupling transformer comprising: a first elongated rectangular block of material of high magnetic permeability, said block having an upper portion providing a structural support for the coupling transformer, and a lower portion including an end surface providing a first main pole face for the magnetic head; a sheet metallic member providing a complete circulation path for electrical current, said member being shaped to include an upper loop substantially encircling the upper portion of said first block, a lower loop positioned adjacent the lower portion thereof, and a coupling portion disposed along said first block and electrically connecting said upper loop and said lower loop together; a transformer winding comprising a plurality of turns wound around said upper portion and said upper loop; a second elongated rectangular block of material of high magnetic permeability positioned in spaced parallel relation to said first block and having an end surface providing a second main pole face aligned with said first main pole face, the space between said main pole faces being substantially less than the width of each main pole face; a thin flat sheet of high magnetic permeability material positioned between said main pole faces and having an edge providing a center pole face, said lower loop being wound around said sheet and having an edge providing, together with said center pole face and said main pole faces, a substantially continuous surface; and means providing a substantially continuous magnetic path from each of said main pole faces through the associated rectangular block to said center pole face.

References Cited in the file of this patent

UNITED STATES PATENTS

| | | |
|---|---|---|
| 2,673,896 | Rettinger | Mar. 30, 1954 |
| 2,694,754 | Connell | Nov. 16, 1954 |
| 2,750,579 | Lekas et al. | June 12, 1956 |
| 2,772,135 | Hollabaugh | Nov. 27, 1956 |
| 2,810,020 | Schwarz | Oct. 15, 1957 |